(12) United States Patent
Casey

(10) Patent No.: US 12,435,516 B2
(45) Date of Patent: Oct. 7, 2025

(54) HEATING SYSTEM AND METHOD OF MAKING AND USE

(71) Applicant: Brian Casey, Tahoe City, NV (US)

(72) Inventor: Brian Casey, Tahoe City, NV (US)

( * ) Notice: Subject to any disclaimer, the term of this patent is extended or adjusted under 35 U.S.C. 154(b) by 881 days.

(21) Appl. No.: 16/793,956

(22) Filed: Feb. 18, 2020

(65) Prior Publication Data

US 2020/0370301 A1 Nov. 26, 2020

Related U.S. Application Data

(63) Continuation of application No. 14/311,713, filed on Jun. 23, 2014, now Pat. No. 10,604,937, which is a continuation of application No. 13/211,175, filed on Aug. 16, 2011, now abandoned.

(60) Provisional application No. 61/374,167, filed on Aug. 16, 2010.

(51) Int. Cl.
  *E04D 13/10* (2006.01)
  *F24D 13/02* (2006.01)
  *H05B 3/56* (2006.01)

(52) U.S. Cl.
  CPC .......... *E04D 13/103* (2013.01); *F24D 13/02* (2013.01); *H05B 3/565* (2013.01); *H05B 2214/02* (2013.01)

(58) Field of Classification Search
  CPC ....... E04D 13/103; F24D 13/02; H05B 3/565; H05B 2214/02
  See application file for complete search history.

(56) References Cited

U.S. PATENT DOCUMENTS

| | | | | |
|---|---|---|---|---|
| 4,336,793 A | * | 6/1982 | Ahearn | F24S 20/67 126/621 |
| 4,445,305 A | * | 5/1984 | Orie, Sr. | E04G 23/02 52/407.3 |
| 6,708,452 B1 | * | 3/2004 | Tenute | E04D 13/0762 52/12 |
| 6,759,630 B1 | | 7/2004 | Tenute | |
| 9,045,907 B2 | * | 6/2015 | Clark | E04D 13/106 |
| 9,556,973 B2 | | 1/2017 | Rumsey et al. | |
| 2001/0032834 A1 | * | 10/2001 | Winters | E04D 13/0445 219/544 |

(Continued)

OTHER PUBLICATIONS

Bylin RIM2 Eave Panel Retrofit Installation Apr. 30, 2001.

*Primary Examiner* — Tiffany T Tran
(74) *Attorney, Agent, or Firm* — Holland & Hart LLP

(57) ABSTRACT

Heating systems including heating elements and fastener materials covered and protected from the environment by a heating cap structure. The heating cap structure can interlock mating ribs or other structure in adjacent heating panels. Additional heating cap, transition, or flashing sections may further cover and protect heating system components. One or more heating elements may include heating cable or heating fluids or materials penetrating heating element bodies. The heating element bodies and heating cap panels and covers can include extruded or otherwise formed sections having a wide variety of shapes that can be varied to provide desired objectives, such as for example supporting strength, increased heat transfer, component cost minimization, component life, heating system weight, and ease of assembly, use, maintenance, expansion, contraction, and adaptability. The outer and other surfaces of the heating system may be painted, including to improve aesthetics. Sealing films and materials may be included.

57 Claims, 15 Drawing Sheets

(56) References Cited

U.S. PATENT DOCUMENTS

2010/0024324 A1\* 2/2010 Meinzer ................ E04D 13/103
165/47
2010/0307076 A1 12/2010 McCowen \* cited by examiner

HEATING SYSTEM AND METHOD OF MAKING AND USE

CROSS-REFERENCE TO RELATED APPLICATIONS

This Application is a continuation of U.S. patent application entitled "Heating System And Method Of Making And Use," Ser. No. 14/311,713, filed Jun. 23, 2014, which is a continuation of U.S. patent application entitled "Heating System And Method Of Making And Use," Ser. No. 13/211,175, filed Aug. 16, 2011, which claims priority through Applicant's prior U.S. Provisional Patent Application entitled "Radiant Roofing Panel And Methods Of Use," Ser. No. 61/374,167, filed Aug. 16, 2010, all of which prior applications are hereby incorporated by reference in their entirety. It is to be understood, however, that in the event of any inconsistency between this specification and any information incorporated by reference in this specification, this specification shall govern.

FIELD OF THE INVENTION

The present invention relates to heating systems and methods of making and use. In one embodiment, the present invention relates to apparatus for reducing formation of, or melting, ice and snow on structure, such as a roof for example.

BACKGROUND

It is typical in many parts of the country that winter conditions create snow accumulations on roofs. As a result, ice forms on roof eaves and intersecting valley areas. A resulting ice dam forms when three conditions are present: 1) there is snow accumulation on a roof; 2) there is heat escaping from the building's interior that melts the accumulated snow; 3) outside ambient temperatures are below freezing, which will cause the melting snow from the heated area to re-freeze along a cold overhang of the roof.

Ice dams create standing water conditions above the ice formation that builds at a roof overhang. This standing water may leak into the structure and cause damage and dry rot. In addition, the accumulated weight of the ice and snow can be damaging to the roofing and the structure. For example, they can freeze to shingles and tear the shingles entirely off the roof.

Prior art that seeks to reduce ice dam formations includes heated edge elements and heat cable in various configurations, frequently in a zig-zag fashion. Heated edge elements, such as Tourangeau's U.S. Pat. No. 5,391,858, minimize the risk of ice dams best if there is a short overhang. The heating roofing panel can be sized to extend from the eave to virtually any point up the roof, therefore protecting against ice dam formations at the edge and up the entire overhang up to and beyond into the heated area of the building, no matter how large the overhang may be.

Exposed zig-zag configurations are a traditional installation method of heat cable, and can reach from the eave to several feet up the roof however, much of the drip edge area remains unheated and can accumulate dangerous icicles and ice formations. Zig-zag heat cable is exposed to the elements, thus leading to accelerated ultraviolet degradation of the cable over time, and also requires a clip to be installed directly through the roofing, creating the risk of leaks. Zig-zag heat cable is sometimes attached to the top of metal roofing panels along eaves. This method fails because the exposed heat cable can be stripped off the roof with high winds or sliding snow. When attached with exposed fasteners, they penetrate and damage the roof, subsequently leaking and requiring ongoing maintenance. The heating roofing panel solves the zig-zag installation's ice formation problems by providing adequate heat along the eaves. Heating roofing panels also conceal the heat cable, make the assembly more aesthetically pleasing to the eye, while protecting it from degrading ultraviolet exposure, and damage from ice, wind, and snow.

Prior art, such as provided by Bylin Engineered Systems as well as Thermal Technologies, has attempted to provide heating roofing panel systems. One example of such systems includes a hat-channel shaped element mounted in a retrofit fashion along the eave edge of metal roofs. The hat channel has wide flanges that bear on the roof plane, and is sized to fit between the ribs of an existing metal roof. The flanges are attached with exposed fasteners through the existing metal roof. This attachment method uses exposed fasteners through an existing roofing system, and these fasteners may loosen, break their seal, and leak. The hat-channel is typically prepainted, but is only available in a small range of colors, so there is a great likelihood of an unsightly match between the existing roofing and the newly attached hat-channel. Further, the upper end of the hat-channel is exposed to roof drainage (exacerbating the leak risk problem) and is subject to being completely torn off when ice and now slides off the roof, destroying the hat-channel system and leaving the roof with exposed holes from the torn-off screws that had earlier secured the hat-channel to the roof.

BRIEF SUMMARY OF ASPECTS OF THIS SPECIFICATION

The applicant has therefore invented an improved heating system and method of use of the system or aspects of a heating system.

In one embodiment, the applicant has provided a heating system with a heating panel or panel section providing a cover or cap over an adjacent heating element. The cover can thereby not only transfer heat from the heating element to the surrounding environment but also prevent water or other material from coming in contact with the heating element and, in some embodiments, other related, underlying, or adjacent structure, such as a roof for example.

In some embodiments, the heating panel or sections of a panel system can include one or more lips, edges, or interfacing elements that can cover fastening structure securing the panel or panel system to underlying or adjacent structure, such as a roof for example. In some embodiments, the interfacing elements also may interlock or otherwise abut each other, with one such abutting element providing a barrier for water or other elements from coming into contact with the other such abutting element and other structure. In some embodiments, other such protected structure can include the heating element, fastening structure, underlying roofing, etc.

In some embodiments, the heating element can include heating cable or conduit. One or more sections of a heating panel or panel system can provide a cover for the heating cable or conduit. In certain embodiments, this can render the heating element and the associated heating cable or conduit covered and not visible when the panel or panel system is mounted in place on, for example, a roof.

In certain embodiments, the heating system can include a transitional cap that can extend from or under adjacent structure, such as roofing shingles or tiles, to prevent water or other materials from running from such adjacent structure to within or under the heating system or components of it.

Methods of making and use the heating system or aspects of it can include various or all of the following steps:
1. if desired (for a retrofit application to a pre-existing roof for example), removing roof shingles or tiles adjacent the edge of a structure, such as the lower edge of a roof;
2. if desired, securing drip eave flashing along the structure edge with a fastener penetrating the flashing into the upper face of the structure edge;
3. if desired, securing a starter heating panel over one end of the drip eave flashing with fasteners penetrating one laterally extending edge of the starter panel;
4. placing a heating element adjacent an underlying structure, such as a roof—in the case of doing so after mounting a starter heating panel, with the heating element also abutting an outer face of a lateral lip section in the starter heating panel and, in some embodiments, with the heating element on top of the drip eave fasteners (if the drip eave is utilized);
5. mounting a full heating panel over the heating element—in the case of doing so after mounting a starter heating panel, so that a mating lip section in the full heating panel clips to or otherwise abuts, and in some embodiments, covering, the lateral lip section in the starter panel; and
6. if desired, securing the full heating panel in place with fastening structure. The order of the steps may be varied as desired, and other steps may be added to provide other aspects as desired. Such other aspects can include mounting or otherwise adding one or more transitional caps, further flashing, and/or other heating element components or covers.

In some embodiments, the heating system can provide a more secure and moisture resistant system, less likely to be affected by environmental or other materials. Such environmental and other materials can include rain, snow, sleet, and material or compositions that can be included in and delivered by rain, snow, or sleet or other environmental conditions.

In some embodiments, the heating system can be particularly effective for retrofitting of pre-existing roofs or other structure to add heating capability to the pre-existing structure.

In some embodiments, the system can be painted or otherwise colored or treated to provide desirable aesthetics for a given environment of use.

In some embodiments, the heating system or aspects of it can be made of lightweight materials.

In some embodiments, the heating system can be easy and/or more economical to manufacture, ship, assemble, and/or use, maintain, and adapt.

In some embodiments, the heating system can be adapted to cooperatively interoperate with other systems, such as solar energy collection systems for example.

There are other many novel and advantageous aspects and features disclosed in the present specification. They will become apparent as this specification proceeds. It is understood, however, that the scope of the invention is to be determined by the claims as issued and not by whether given subject matter includes one or more aspects recited in this Brief Summary or addressed in the Background above.

BRIEF DESCRIPTION OF THE DRAWINGS

The applicant's preferred and other embodiments are shown in the accompanying drawings in which.

DETAILED DESCRIPTION OF THE PREFERRED AND OTHER EMBODIMENTS

The following is a detailed description of the applicant's preferred and other embodiments for the system and methods of making and use. It is to be understood that this detailed description is not itself limiting and is intended rather to disclose exemplary embodiments in support of the present specification.

Figure 1:
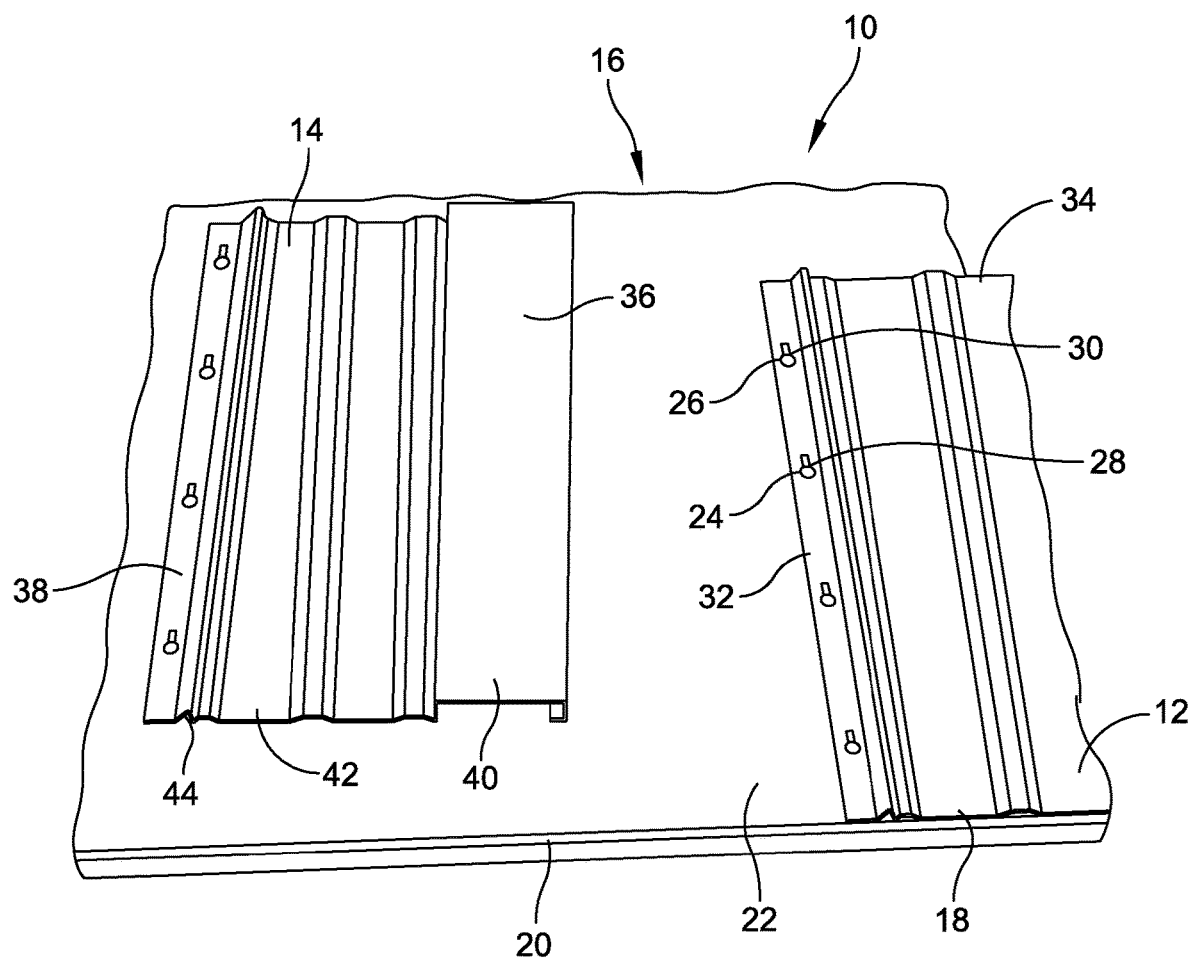
FIG. 1 is a perspective view of a first heating panel mounted on an underlying roof section with a second heating panel oriented to be mounted to the second heating panel and underlying roof.

Collectively, FIGS. 1 through 9 and their associated text disclose certain methods of making and use of the heating system collectively disclosed in these same Figures. With reference first to FIG. 1, therefore, a heating system 10 can include a first 12 and a second heating panel 14. Heating panels (and other heating panels, covers, caps, and similar structures disclosed herein), e.g. 12, 14, may be made of any material that will radiate heat to the surrounding environment. When used on a roof 22 to radiate heat to surrounding environment 16, such as adjacent snow, ice, and water, etc., the heating structure may be made of aluminum, copper, or other metal sheeting or sheeting including metal or heat generating or transfer properties. The sheeting may be preformed, extruded, or molded, and it may be coated with various surface finishing treatments. Exemplary aluminum sheeting is in the range of 0.020 to 0.080 inches thick (weighing 0.25 to 1 lb. per square foot), most preferably nominally 0.04 inches thick (weighing 0.58 lb. per square foot) generally.

With continuing reference to FIG. 1, the first heating panel 12 has a lower linear edge 18 abutting the drip eave 20 of an associated underlying structure 22 such as a building roof for example. The underlying structure 22 may be either new or pre-existing and previously used without the heating panels 12, 14 and associated heating system disclosed herein on the underlying structure 22 at the location of installation described herein.

The first heating panel 12 is secured in position on the underlying structure 22 by means of fasteners, e.g., 24, 26, penetrating mating fastener passages, e.g., 28, 30, along a fastening edge 32 of the first heating panel 12. The fastening edge 32 extends transversely from the lower linear edge 18 of the first heating panel 12, and an upper linear edge 34 extends parallel to the lower linear edge 18 transversely from the fastening edge 32.

The first heating panel 12 and second heating panel 14 of FIG. 1 can have the same shape. With reference to the second such panel 14, it also has a cover clip edge 36 parallel to and opposite the fastening edge 38 of the second heating panel 14. An inverted-U-shaped heating element cover section 40 extends along, and is somewhat coextensive with, the heating element cover clip edge of the cover section 40. An interconnecting generally planar section 42 of the second heating panel 14 extends from the heating element cover section 40 to an upwardly projecting panel interlock rib 44 that also extends laterally along the panel 14 (i.e., parallel to the fastening edge 38 of the heating panel 14 with fastener passages 28, 30 linearly penetrating the fastening edge 38 intermediate the panel interlock rib 44 and outermost side of the fastening edge 38).

Alternatively, the first heating panel 12 may have a shape differing from that of the second heating panel 14. Thus, the first heating panel 12 may consist of a starter panel (not shown) consisting only of a generally planar section (for mounting adjacent a roof gable edge for example), a raised interlocking rib transversely extending upwardly from the generally planar section (opposite the edge of the generally planar section for mounting adjacent the roof gable edge for example), and a planar fastening section extending from side of the interlocking rib opposite the generally planar section. Thus, this starter panel may consist of panel of the type shown in FIG. 1 but with the heating element cover section 40 cut-off or otherwise not present in the structure.

Similarly, other heating panels not shown, such as those at the end of a heating system installation along a roof edge for example, may have other shapes adapted to conform to the roof edge structure at the end location.

In FIG. 1, the second heating panel 14 is located to be moved toward mounting the second radial panel 14 to the first heating panel 12. This will be further explained as the specification proceeds.

Figure 2:
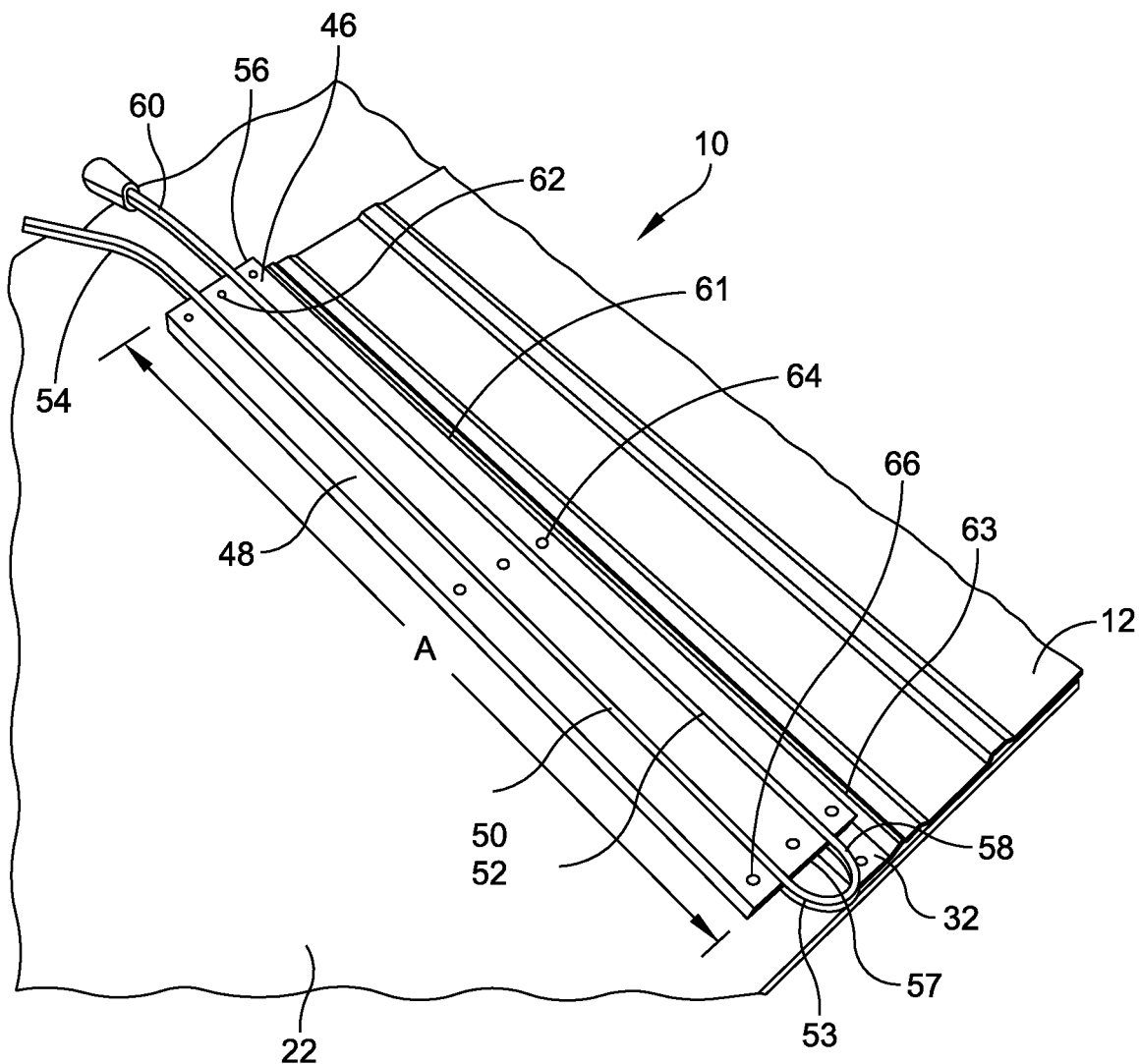
FIG. 2 is a perspective view of a heating element being mounted adjacent the laterally upwardly extending lip of the first heating panel section of FIG. 1.

With reference now to FIG. 2, a laterally extending heating and panel supporting element 46 has a heating element body 48 with a heat cable 53 penetrating two parallel heat cable channels 50, 52 extending along the lateral length of the heating element 46. The heat cable 53 (or other heating media) is mounted in the cable channels 50, 52, so that (i) one end 54 of the cable 53 enters the first heat cable channel 50 at the upper end 56 of the heating element 46, (ii) the cable 53 extends through and exits the first heat cable channel 50 at the lower end 57 of the heating element 46, (iii) an exposed section 58 of the cable 53 extends from the first cable channel 50 to the second cable channel 52, and (iv) the cable 53 then continues to extend through and exits the second heat cable channel 52 so an exiting section 60 of the cable 53 extends past the upper end 56 of the heating element 46.

The exposed section 58 may be adjusted in length and orientation as desired to heat at or past (not shown) the underlying structure 22. In some embodiments (not shown), the exposed cable section 58 may be run to yet additional structure such as one or more gutters.

The length A of the heating element 46 can be somewhat shorter than the length of the fastening edge 38 of the first heating panel 12. An exemplary length A is four inches shorter than the length of the fastening edge 38, but this differential may be adjusted as desired to, if desired for example, cover the exposed section 58 of the cable 53 with an other heating panel (not shown in FIG. 2) included with the heating system 10.

The heating element body 48 is positioned so it has a first laterally extending abutment edge 61 laterally extending along and matingly abutting the panel interlock rib 63 in the first heating panel 12. The heating element body 48 thus also is mounted to cover the fastening edge 32 of the first heating panel 12 as well as the first heating panel fasteners (not shown in FIG. 2) penetrating the fastening edge 32. The heating element body 48 can be secured to the underlying structure by fasteners, e.g., 62, 64, 66, penetrating through mating fastener passages (not shown in FIG. 2) to extend into, and thereby fasten to, the underlying structure 22.

The heating element body 48 (and other heating element bodies disclosed herein) may be made of extruded aluminum or other metal or material composition that will transfer heat from a heating source in the heating element body 48 to associated heating panel material. An exemplary heating element body 48 is one inch thick (top to bottom) by 3 inches wide by 36 inches long.

The heating element cable 53 (and other heating element cables disclosed herein) may be made of cable that will heat as desired. Exemplary such cable is a self-regulatory heating cable such as 2× manufactured by TycoThermal of Menlo Park, CA. This or other types of electrical cables can be supplied with electrical power in ways well known in the art (for example, with an automated DS-8 controller from ASE, Inc., Colorado Springs, CO, in which the system is triggered by sending both moisture and sub-34 degree Fahrenheit temperatures). The power supply for the system 10 may provide a variety of voltages, such as 110 volts and 220 volts.

Other sources of energy and heat may be used in addition or in the alternative. For example, the heating element body 48 (and other heating element bodies disclosed herein) may itself provide or otherwise accommodate a fluid conduit through which a heat transfer fluid or other material might flow. The heat transfer fluid or material can be provided by a number of means, including if desired by heat transfer fluid or material from or for a solar energy collection system.

The present heating system 10 may therefore also be used as a part of a solar energy collection system. This may include using the heating system 10 to collect energy by heating of a heat transfer fluid or material incorporated in the heating system. Particularly during warmer seasons, the heating system 10 can thereby become a means of collecting and transferring energy that would otherwise be wasted in the heating system as it is heated by, e.g., the sun, or that might also undesirably increase temperature of the associated structure, such as an associated building, during certain times of the year.

Figure 3:
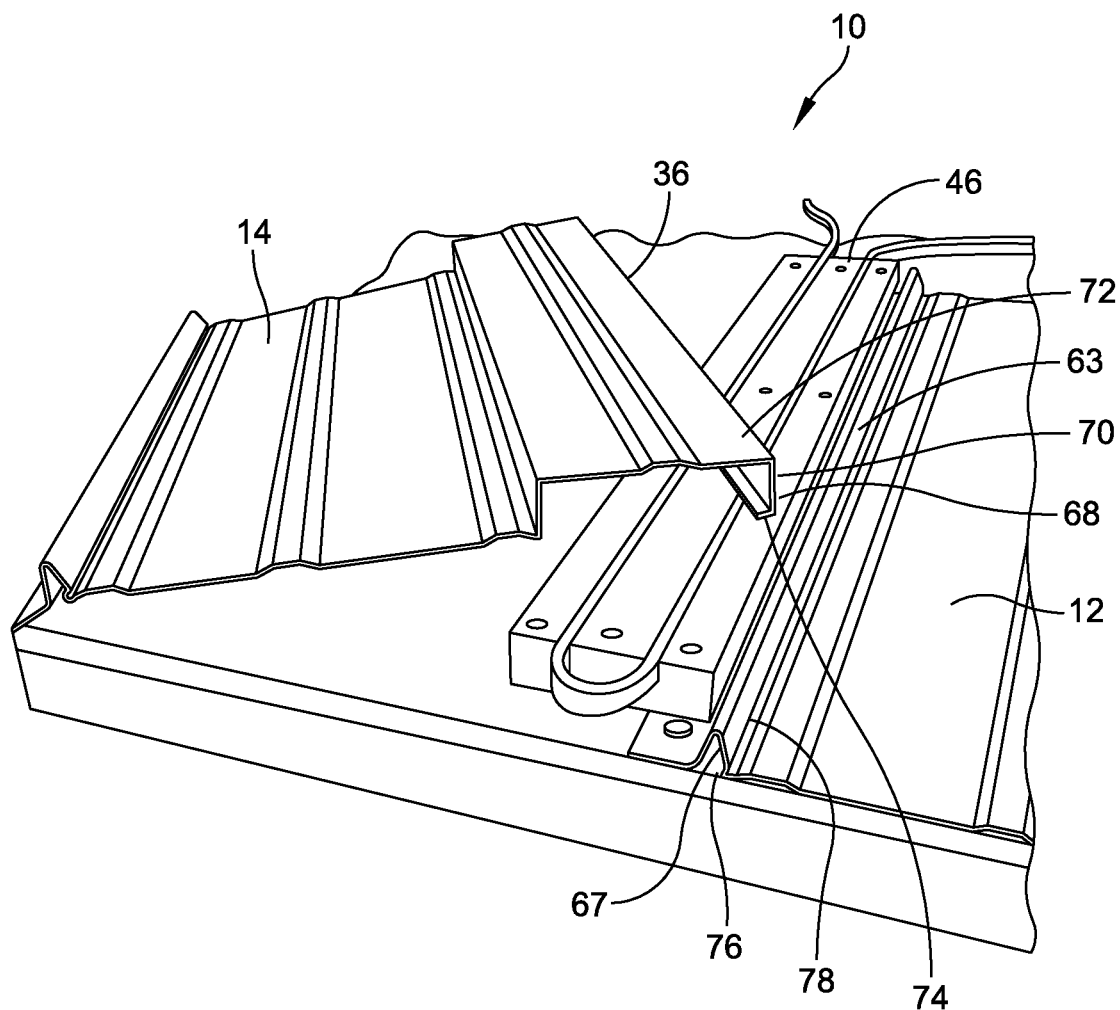
FIG. 3 is a perspective view of the second heating panel of FIG. 1 moved toward its mounting position adjacent the first heating panel of FIG. 1.

With reference now to FIG. 3, the panel interlocking rib 63 includes an inverted-V-shaped section 67 formed in the first heating panel 12. The cover clip edge 36 of the second heating panel 14 consists of a resilient, inverted-U-shaped section 68 with a central planar section 70 extending intermediate opposed transversely extending upper and lower planar u-arm sections 72, 74. The lower U-arm section 74 provides a clip-end for penetrating a mating rib slot 76 formed in and extending laterally along the lower base 78 of the panel interlocking rib 63.

Figure 4:
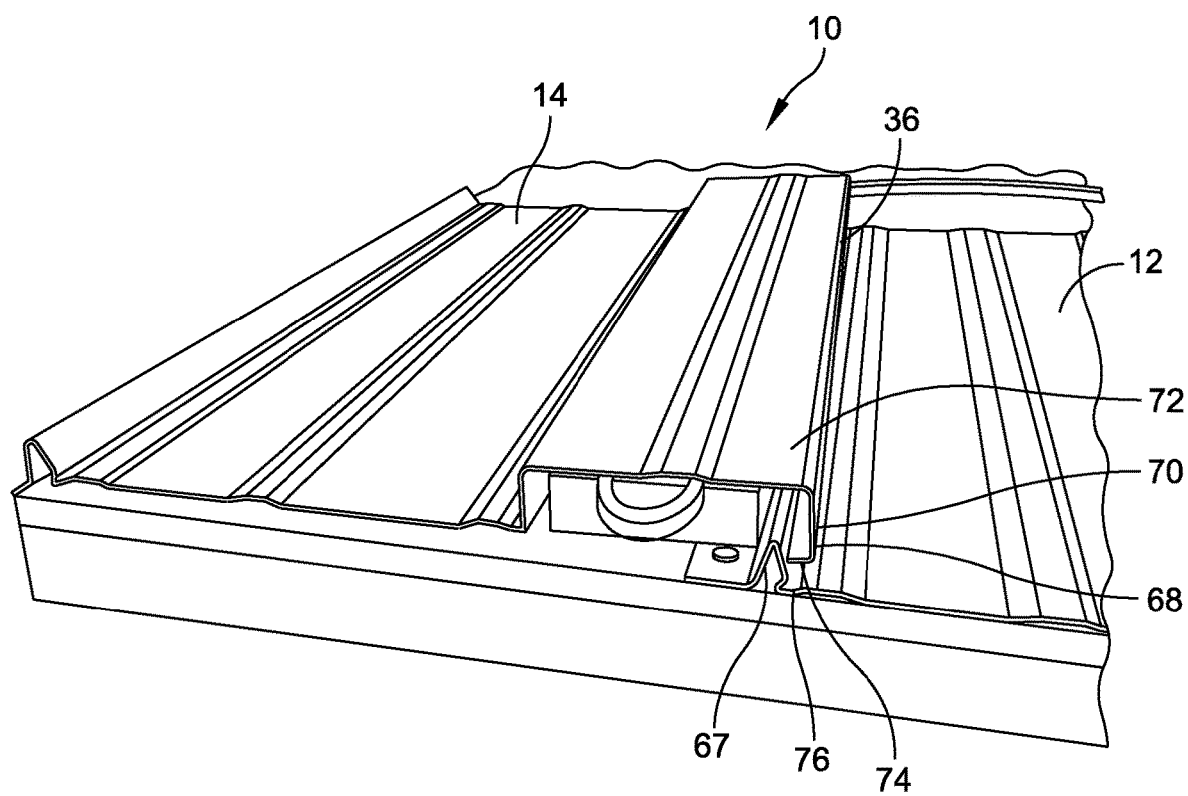
FIG. 4 is a perspective view of the second heating panel of FIG. 1 being mounted with a laterally downwardly extending lip edge of the second heating panel above and adjacent the laterally upwardly extending lip or interlocking rib of the first heating panel section of FIG. 1.
Figure 5:
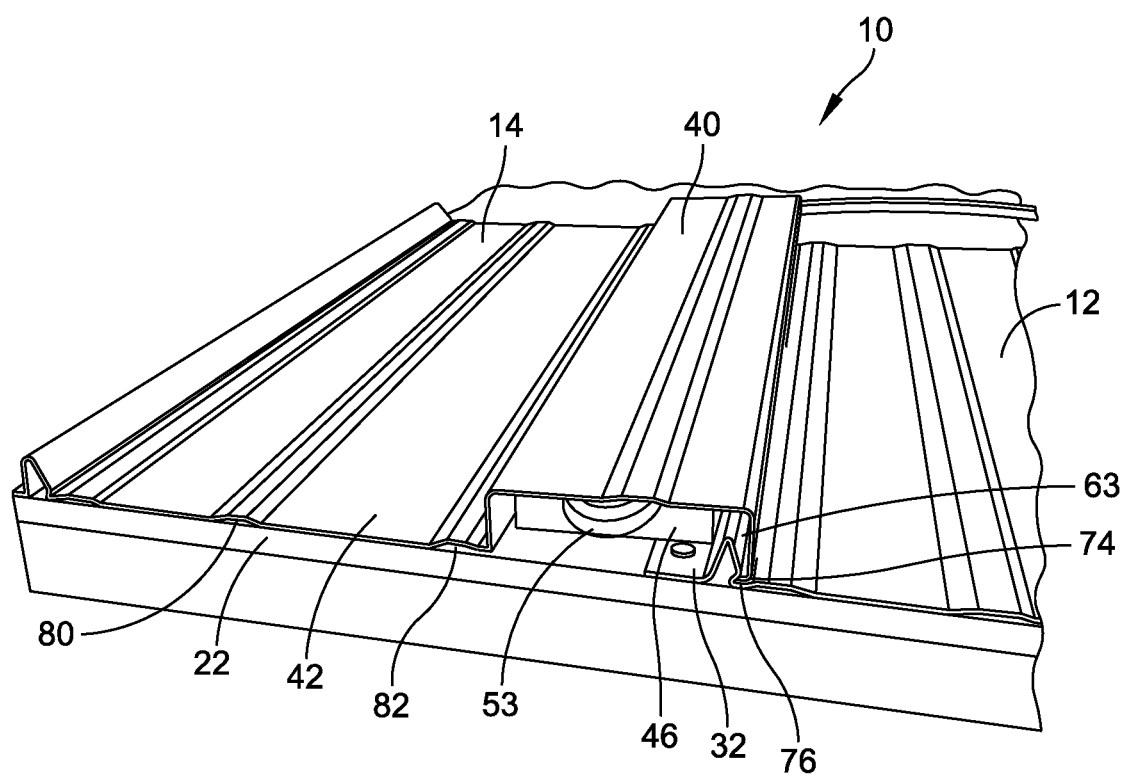
FIG. 5 is a perspective view of second heating panel of FIG. 1 mounted over the first heating panel, the underlying heating element, and the underlying roof.
Figure 6:
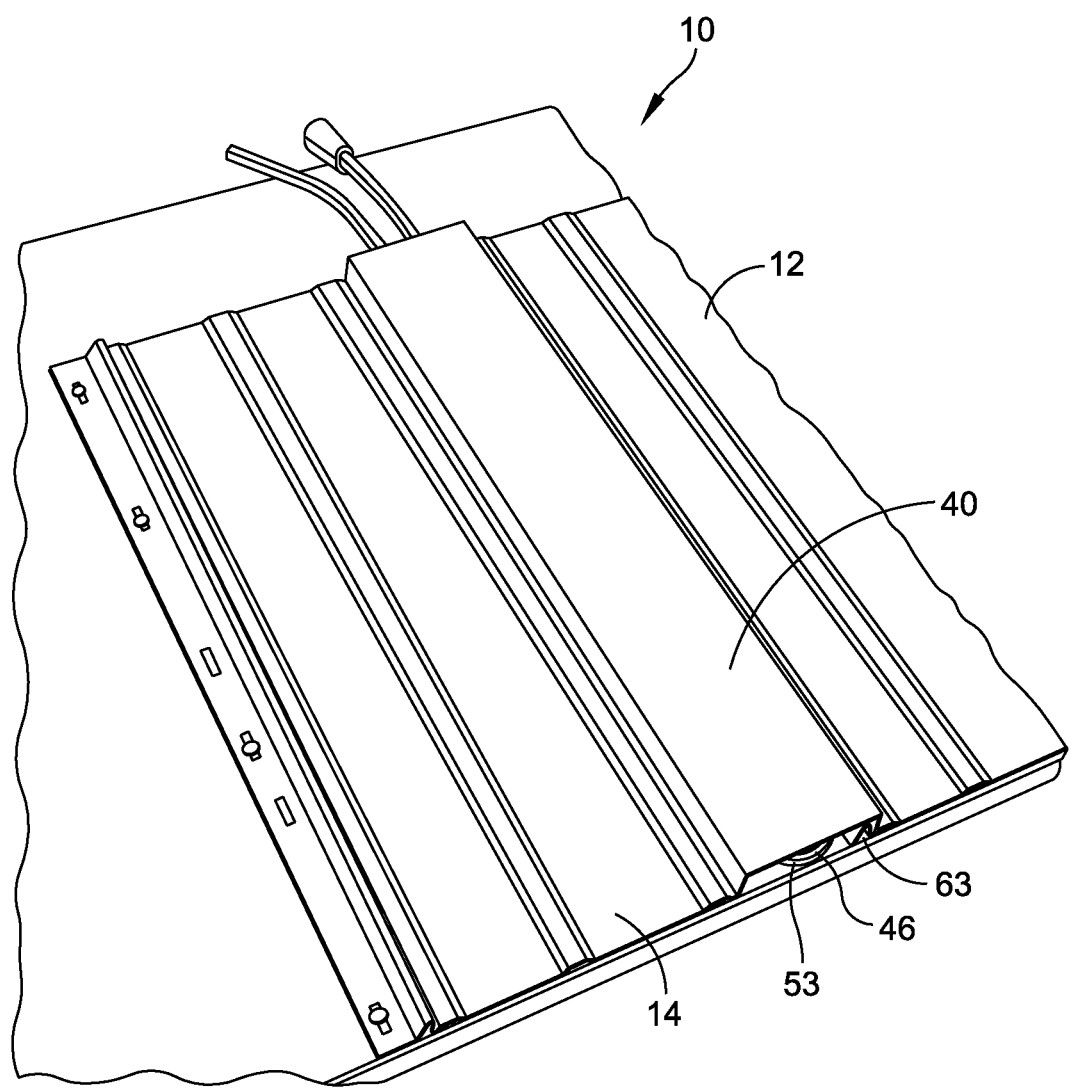
FIG. 6 is a second perspective view of the heating system of FIG. 5, with the heating cable extending from the upper edge of the first and second heating panels.

Consequently, with reference now to FIG. 4, during assembly of the heating system 10, the lower arm section 74 is aligned adjacent the mating rib slot 76 so that, as shown in FIG. 5, the lower arm section 74 penetrates the rib slot 76 when the second heating panel 14 is mounted in position with respect to the first heating panel 12 as shown in FIG. 5. With continuing reference to FIG. 5, the second resilient panel 14 can be secured in this mounted position by means of fasteners (not shown in FIG. 5) in the same fashion as described above to mount the first heating panel 12. As also shown in FIG. 6, the second resilient panel 14 can thereby cover, shield, protect, and reduce from being viewable the underlying heating element 46, including the lower exposed section 53 of the heating cable. At the same time, the underlying heating element 46 not only abuts and thereby supports the heating element cover section 40 but also is in heat transfer communication and contact with both the first heating panel 12 and first heating panel 14. This type of contact takes place via heating element 46 contact with the heating element cover section 40, the fastening edge 32 (not shown in FIG. 6), and panel interlocking rib 63.

The interconnecting section 42 of a heating panel, e.g., 14, may include one or more raised sections, e.g., 80, 82. These raised sections, e.g., 80, 82, may be integrally formed in the interconnecting section 42 to reduce heat transfer and loss contact with the underlying structure 22 as well as to provide a drain for any fluid, such as water, from areas above the heating panel, e.g., 14.

Figure 7:
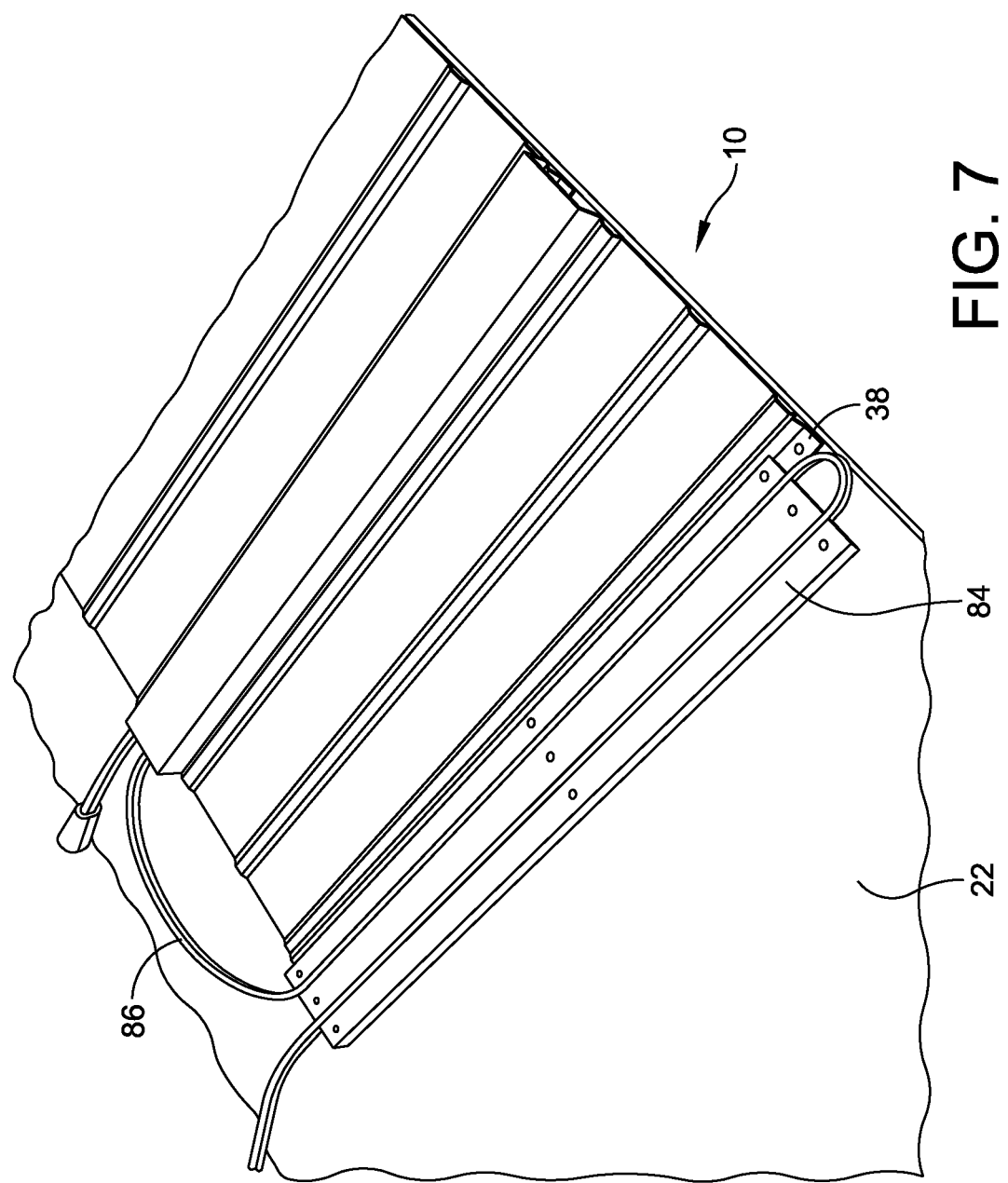
FIG. 7 is a perspective view of the heating system of FIG. 6 with a second heating element, including heating cable, mounted to abut the laterally upwardly extending edge of the second heating panel.
Figure 8:
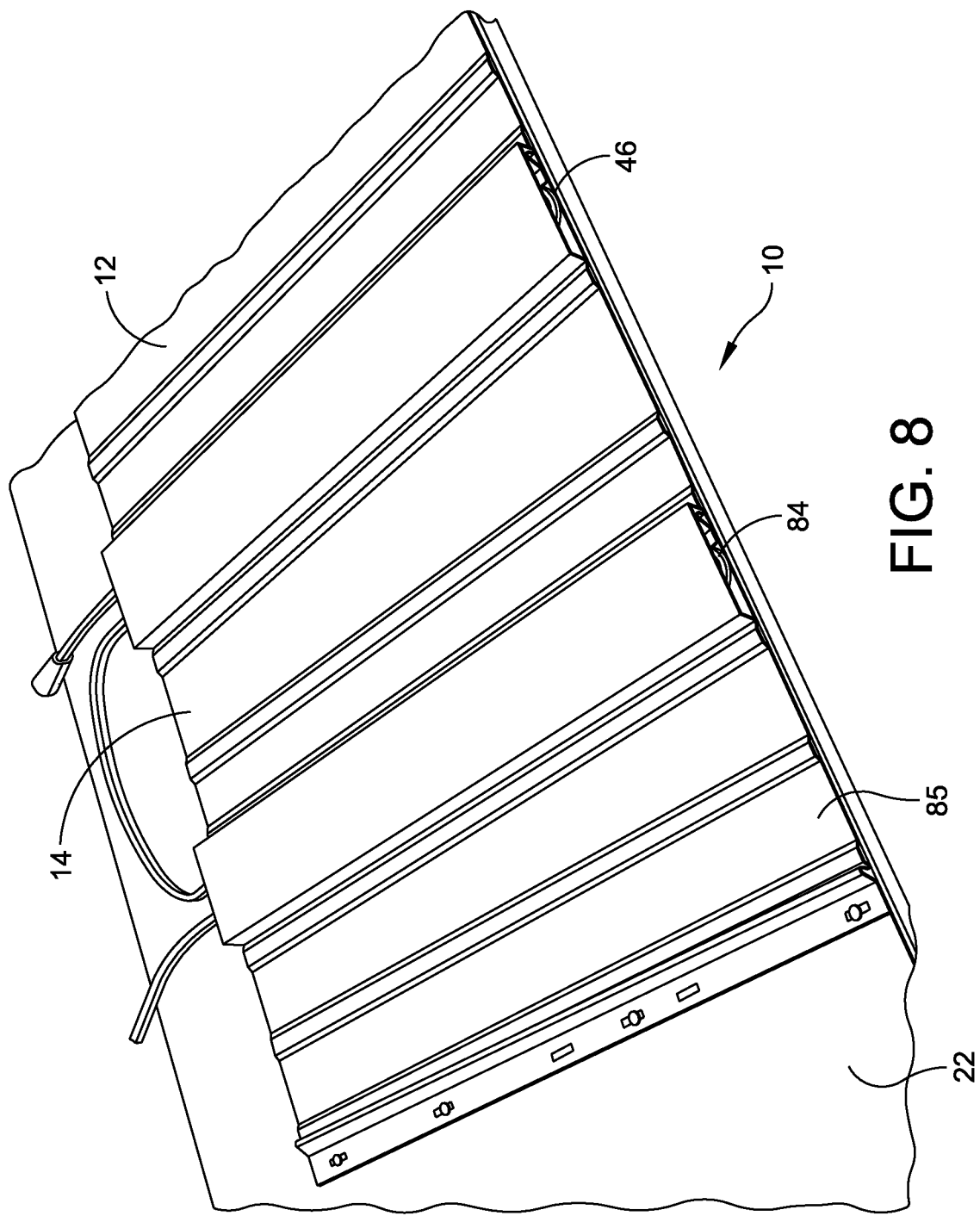
FIG. 8 is a perspective view of the heating system of FIG. 7 with a third heating panel mounted to cover (i) the second heating panel's laterally upwardly extending edge, (ii) the second heating element, and (iii) an underlying roof section.

With reference now to FIGS. 7 and 8, the size of the heating system 10 may be expanded as desired by repeating the manufacturing and assembly technique described above in association with FIGS. 1-6. Thus, a second heating element 84 may be mounted over and abut the fastening edge 38 of the second heating panel 14. Similarly, additional heating panels, e.g., 85, and additional heating elements (not shown) may be added to extend as desired across an underlying structure 22, such as along the edge of a roof structure if so desired. The various heating elements, e.g., 46 (not shown in FIG. 7), 84, may share one or more of the same heating cables, e.g., 53, by, for example, having a cable 53 extend from one heating element 46 to another heating element 84 via an interconnecting heating cable section 86.

Figure 9:
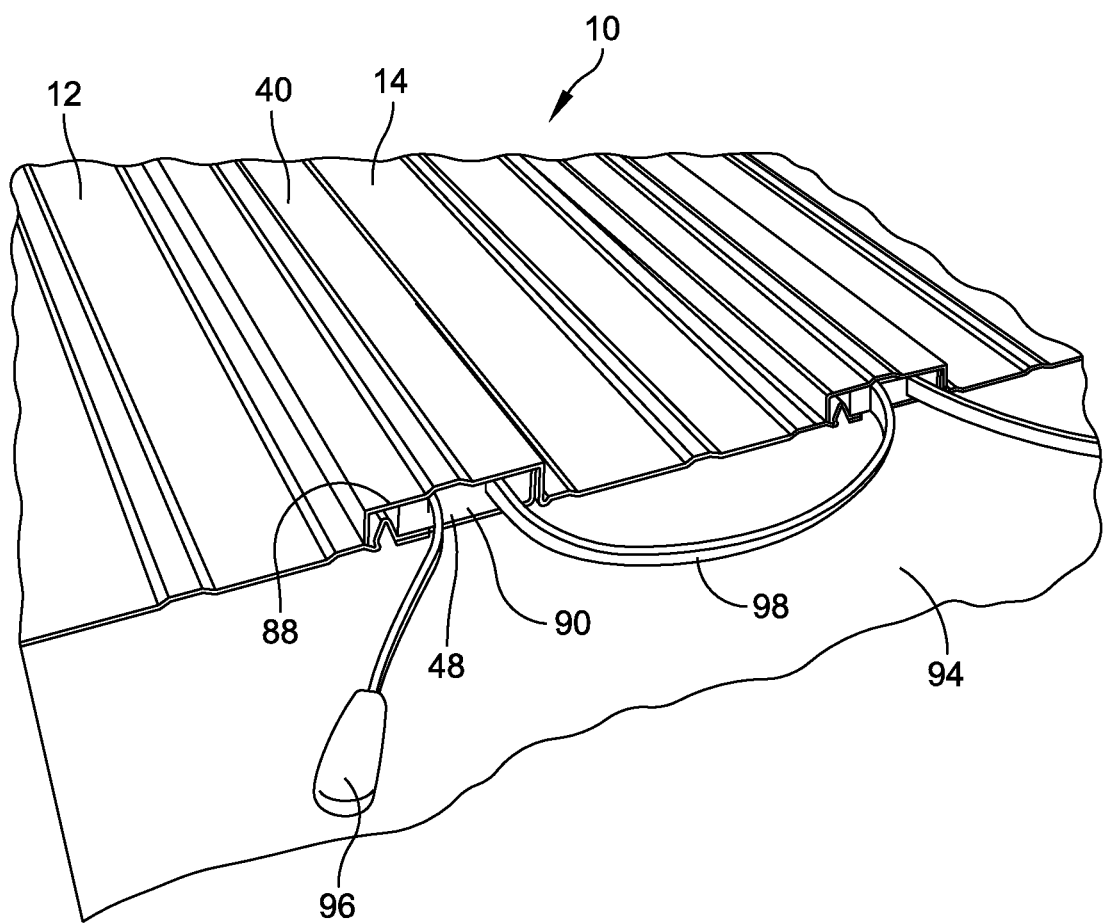
FIG. 9 is a perspective view of the heating system of FIG. 8, looking downward from the upper edge of a heating system mounted on a roof, with exposed heating cable extending from the upper edge of the heating panels.

With reference now to FIG. 9, the upper end 88 of the heating element cover section 40 abuts and covers only the upper end 90 of the heating element body 48. Further, the heating element cover section 40 is spaced from the exposed underlying structure 94 above the heating panels, e.g., 12, 14. A power plug end 96 on the heating element cable 98 may penetrate a power outlet mounted in the underlying structure 94 or other structure as desired.

The heating system disclosed in FIGS. 1 through 9 can be relatively lightweight. With the heating panel components and heating element body made of aluminum for example, the weight of the heating system is generally from 1.5 to 3 lbs. per square foot. In this regard, the dimensions of a typical heating panel 12 are generally 36 inches×16 inches×1 inch tall. Alternatively, the weight of the heating system is within the range of 1.5 to 4 lbs. per square foot.

Figure 10:
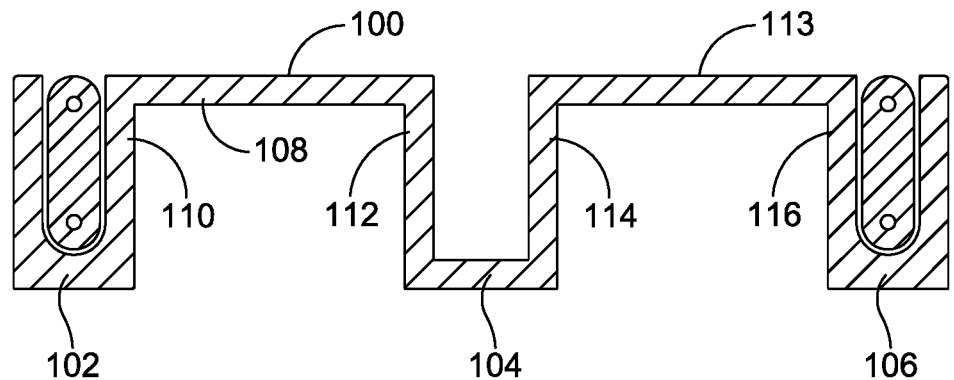
FIG. 10 is a cross-sectional view of an alternative embodiment of a heating element including heating cable channels and heating panel supporting and contact structure.

Referring next to FIG. 10, an alternative heating element body 100 is molded, stamped, formed, or extruded to include first outer 102, central 104, and second outer 106 U-shaped sections. A first planar support section 108 interconnects opposed upper ends 110, 112 of the first outer 102 and central 104 U-shaped sections, and a second planar support section 113 interconnects opposed upper ends 114, 116 of the central 104 and second outer 106 U-shaped sections. This structure can reduce the amount of material in (and cost and weight of) the heating element body 100 and the amount of contact of the heating element body contact and heat transfer loss with underlying support structure (not shown) while still providing substantial heat transfer contact with associated heating panel(s) (not shown in FIG. 10) and support for the heating element cover section (not shown in FIG. 10). In some embodiments, this structure may also allow for use of self-penetrating fasteners to secure, e.g., the central U-shaped section 104 to an underlying structure (not shown in FIG. 10).

Figure 11:
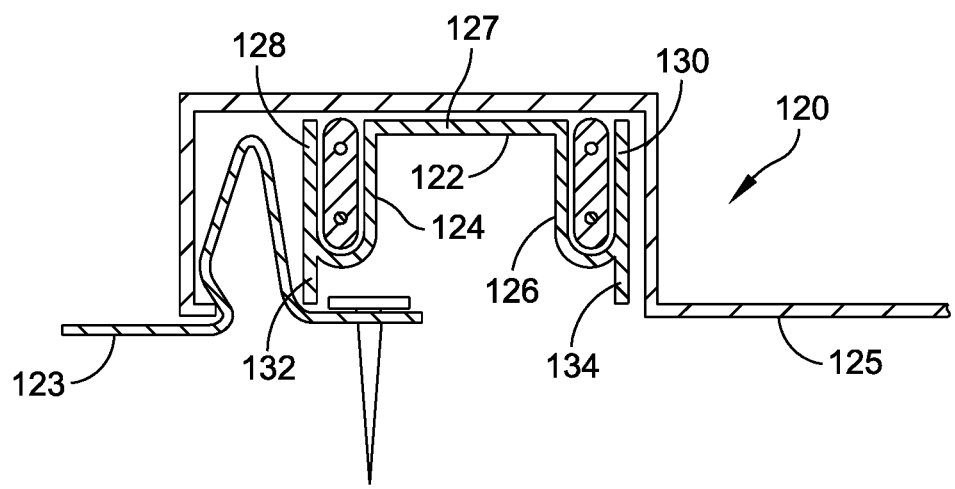
FIG. 11 is a cross-sectional view of a yet another alternative embodiment of a heating element having spacing support arms, with the heating element abutting an associated and interconnected first and second heating panel.

With reference now to FIG. 11, a yet alternative heating panel system, generally 120, may include a yet additional type of heating element body 122 in contact with associated heating panels 123, 125. The heating element body may include opposed U-shaped cable channels 124, 126 interconnected by an upper planar section 127, and outer U-arms 128, 130 of such channels 124, 126 may respectively include opposed downwardly extending support legs 132, 134. This type of heating element body 122 can further the amount of material in the heating element body while reducing contact and heat transfer communication between the heating element body 122 and underlying support structure (not shown in FIG. 11).

Figure 12:
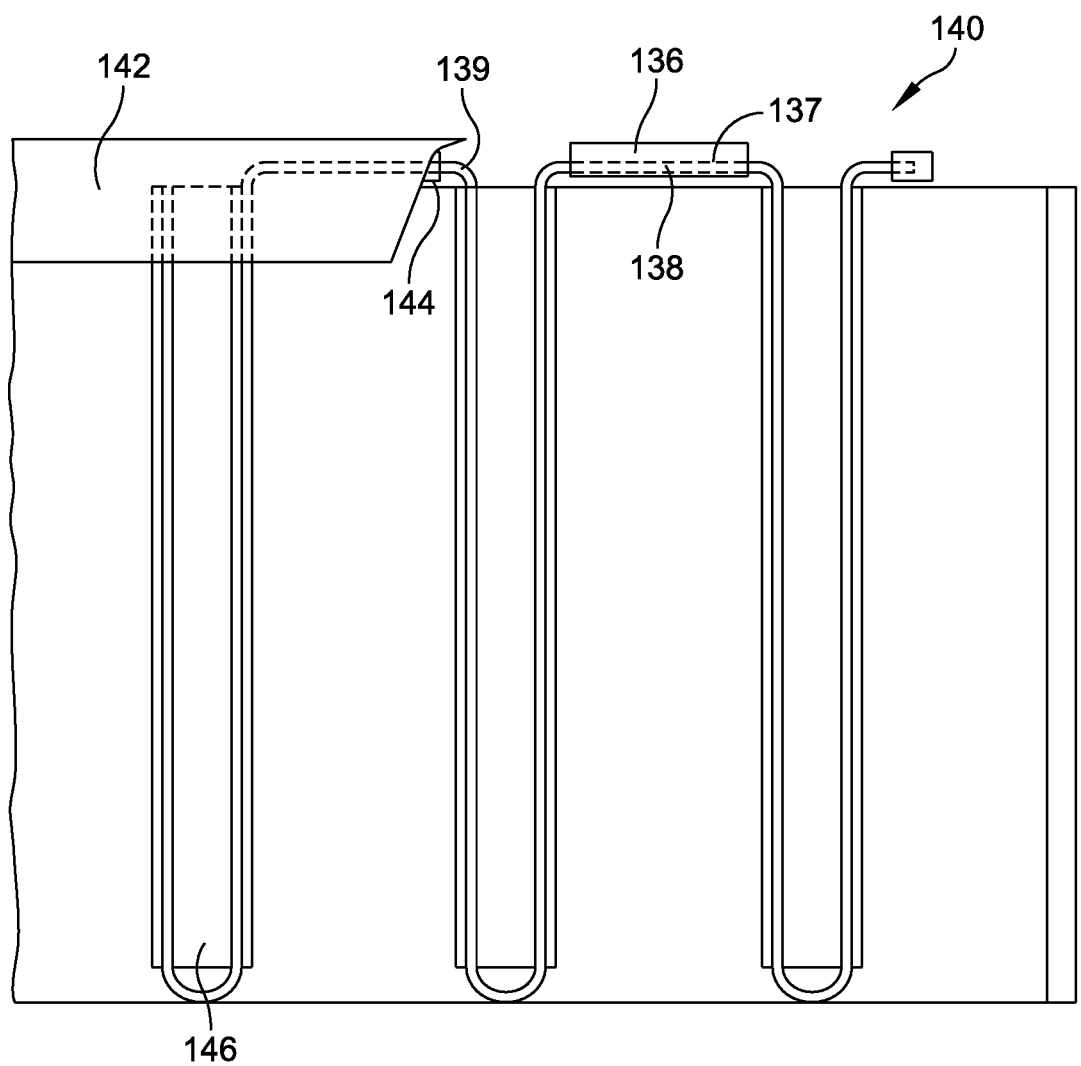
FIG. 12 is a schematic view of an embodiment of the heating system showing the laterally extending heating elements with heating cable extending between them and a heating transition cover panel extending along and above the uppermost portions of the heating elements.

Referring to FIG. 12, heating panel systems, generally 140, may include additional heating element bodies, e.g., 136, mounted to underlying or other support structure (not shown) and supporting within interior heating element channels, e.g., 137, otherwise exposed heating cable sections, e.g., 138. Heating transition cap or flashing panels or other structures 142 may extend over and protect the exposed heating cable sections, e.g., 139, and one or more associated additional heating element bodies, e.g., 144. Such or other cap or flashing panels may also be mounted to be in supporting and heat transfer contact with one or more additional heating element bodies, e.g., 144, as well as with the upper surface of other heating panel structure covering the laterally extending heating elements, e.g., 146.

Figure 13:
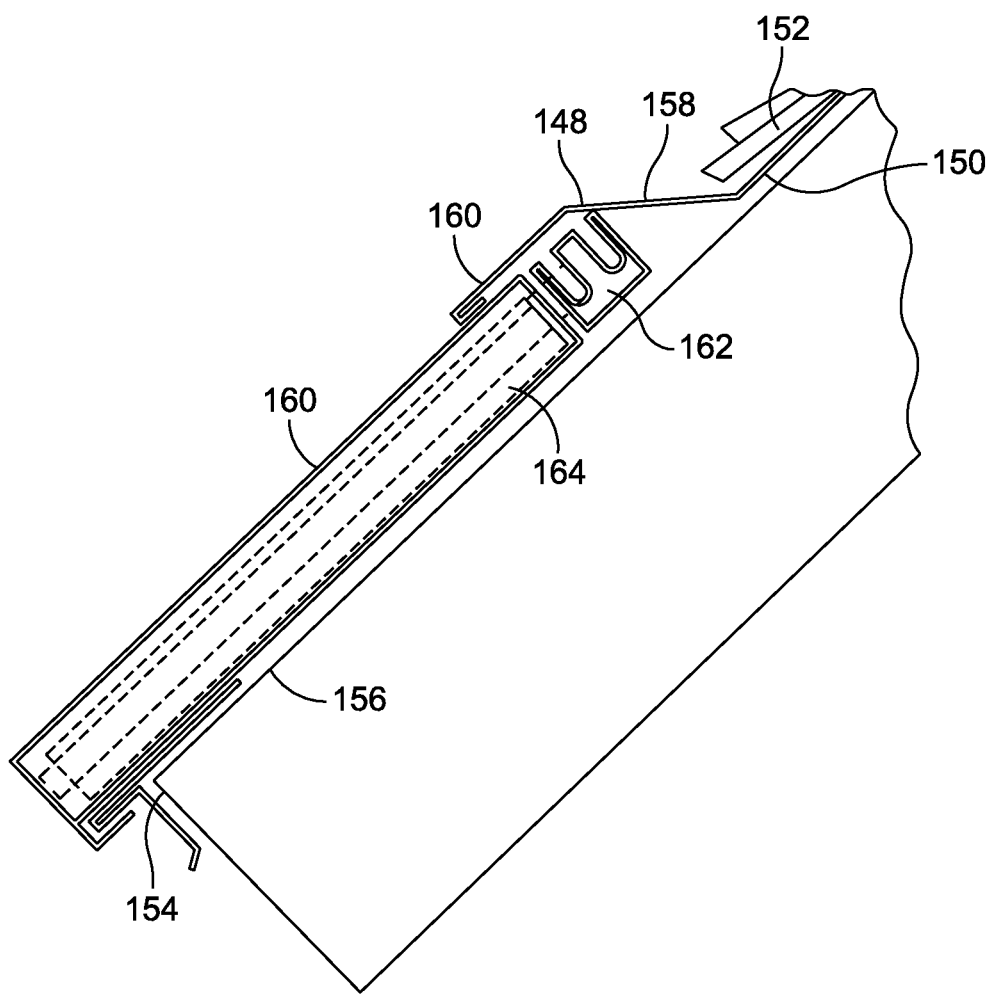
FIG. 13 is a cross-sectional schematic view of an embodiment of a heating system showing the lower edge drip eave flashing, the laterally extending heating element in phantom, the sealing cover cooperatively provided for the laterally extending element by two adjacent heating panels, a transversely extending heating element above the heating panels, and a heating transition cap covering the transversely extending heating element and associated upper sections of the heating transition cap.

Referring now to FIG. 13, an alternative transition or cap heating panel 148 may include a laterally extending flashing section 150 secured under or to associated (commonly upper) structure such as, for example roof shingles or tiles or other roofing structure 152 located adjacent and commonly distal from a lower edge 154 of the underlying support structure or roof 156. The cap heating panel 148 has an inclined ramped section 158 extending at an obtuse angle from the laterally extending flashing section 150 to abut, e.g., a lower heating element 162 and to terminate in an integral planer heating panel cap cover section 160 extending from the ramped section 158. The heating panel cap cover section 160 extends separated or somewhat distal from the underlying support structure surface 156 to cover and protect the heating element sections 162, 164 adjacent the associated structure 152. Similarly, the heating elements 162, 164 can support and provide heat transfer communication with the cap heating panel 148.

Figure 14:
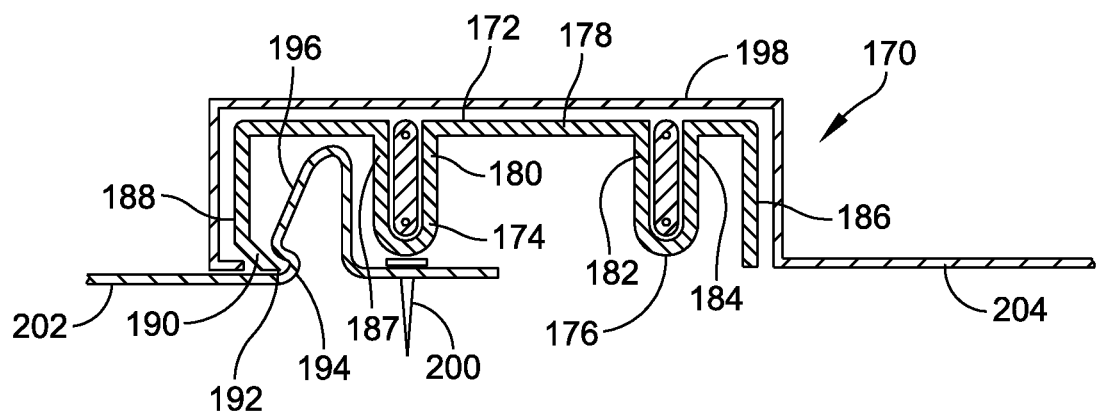
FIG. 14 is a partial cross-sectional view of two abutting heating panel sections with a further alternative embodiment of the heating element, providing further panel contacting, supporting, and sealing structure.

With reference now to FIG. 14, a still further alternative embodiment of the heating panel system 170 has a heating element 172 that includes two interior U-shaped heating element channels 174, 176 interconnected at the upper interior arm ends 180, 182 by an interconnecting central planar section 178. Extending from a first exterior channel arm end 184 is an inverted L-shaped support leg 186, and extending from an opposed second exterior channel arm 187 is an oppositely facing, inverted L-shaped support leg-clip 188. The height of the support leg 186 and support leg-clip 188 is greater than the height of the interior U-shaped heating elements channels 174, 176. This can reduce heat transfer contact of the heating element 172 with underlying support structure (not shown in FIG. 14).

The clipping end 190 of the support leg-clip 188 includes an inwardly bent or formed clipping lip that penetrates a mating rib slot 192 formed in and extending laterally along the base 194 of the panel interlocking rib 196. The associated heating panel cover cap 198, which is made of resilient material, extends around the inverted L-shaped support leg 186 to abut and resiliently grip the leg-clip 188. This structure can, in some embodiments, provide further sealing of structure, such as fasteners, e.g., 200, under the cover cap 198 and associated heating panels 202, 204.

Figure 15:
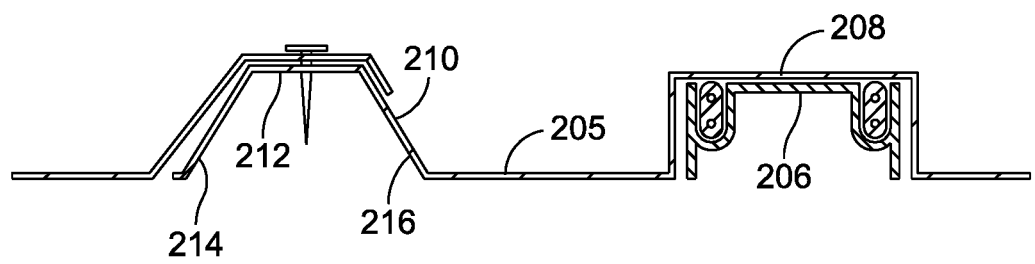
FIG. 15 is a partial cross-sectional view of an alternative heating panel and mating transition cap interlocked by a fastener that need not necessarily (in all embodiments) penetrate underlying structure.

With reference now to FIG. 15, an additional alternative heating system may have one or more heating panels, e.g., 205, with lateral heating element, e.g., 206, and surrounding heating panel cover sections, e.g., 208, separated from a heating panel interconnecting rib 210 or other structure (not shown) formed in the heating panel 205. Further, the interconnecting rib 210 may have a variety of shapes; shown in FIG. 15 is an interconnecting rib 210 having a central planar section distal from underlying support structure (not shown) and with opposed inclined support sections 214, 216 extending from the central planar section 212 toward the underlying support structure. The surrounding heating panel cover sections, e.g., 208, may have many shapes; shown in FIG. 14 is an inverted U shaped such section.

Figure 16:
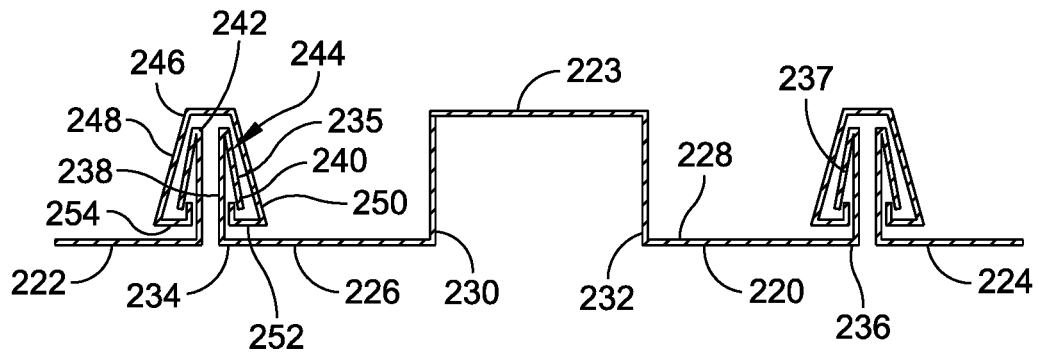
FIG. 16 is a partial cross-sectional view of an alternative interlocking heating panel configuration, with a central heating element cap.

With reference now to FIG. 16, a further alternative heating system has one or more laterally extending heating panels, e.g., 220, 222, 224, each of which, e.g., 222, have a central inverted-U-shaped heating element cover section 223 intermediate two opposed outwardly extending planar section 226, 228 respectively extending from opposed lower arm ends 230, 232 of the cover section 223. At the outer end edges 234, 236 of the two opposed planar sections 226, 228 respectively are upwardly extending interconnecting interlocking ribs 235, 237 respectively. Each such rib, e.g., 235, includes a vertically upwardly extending arm 238 with a relatively shorter resilient locking arm 240 extending at an acute angle from the top of the vertically upwardly extending arm 238 downwardly both toward the adjacent outwardly extending planar section 226 and in the direction of the central heating element cover section 223.

Adjacent ribs, e.g., 235, 242, from adjacent heating panels 220, 222 respectively, cooperatively from a joint upwardly extending rib structure 244. An inverted V-shaped locking heating rib cap 246 has opposed downwardly extending, resilient rib cap arms 248, 250. The resilient arms 248, 250 each have inwardly protruding, arm locking, resilient L-shaped lips 252, 254 biased to clip on, surround, and hold in position the adjacent rib arms 248, 250 and to thereby secure in position their associated entire ribs 235, 242 with respect to each other and associated underlying support structure (not shown).

Figure 17:
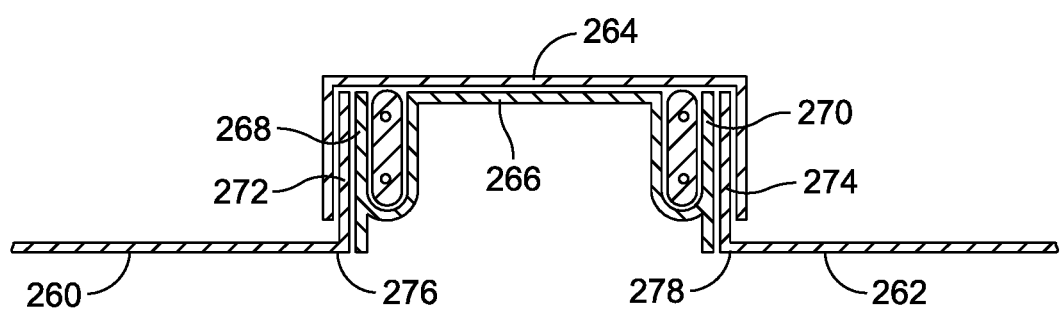
FIG. 17 is a partial cross-sectional view of yet another alternative heating system configuration, providing an inverted-U-shaped heating cap over two adjacent heating panels that each abut an intermediate laterally extending heating, supporting, and spacing element.

Referring to FIG. 17, another alternative heating system includes adjacent first and second heating panels 260, 262 interconnected by a central heating inverted-U-shaped heating cap 264. The heating cap 264 covers and protects and underlying heating element 266 of the type described in connection with FIG. 11 but with differing associated heating panel and cap structure as shown in FIG. 17. The outer opposed, upwardly extending cable channel arms 268, 270 of the heating element 266 respectively abut opposed, resilient, planar panel sections 272, 274 that respectively upwardly extend from the opposed outer edges 276, 278 of the adjacent heating panels 260, 262 respectively.

Figure 18:
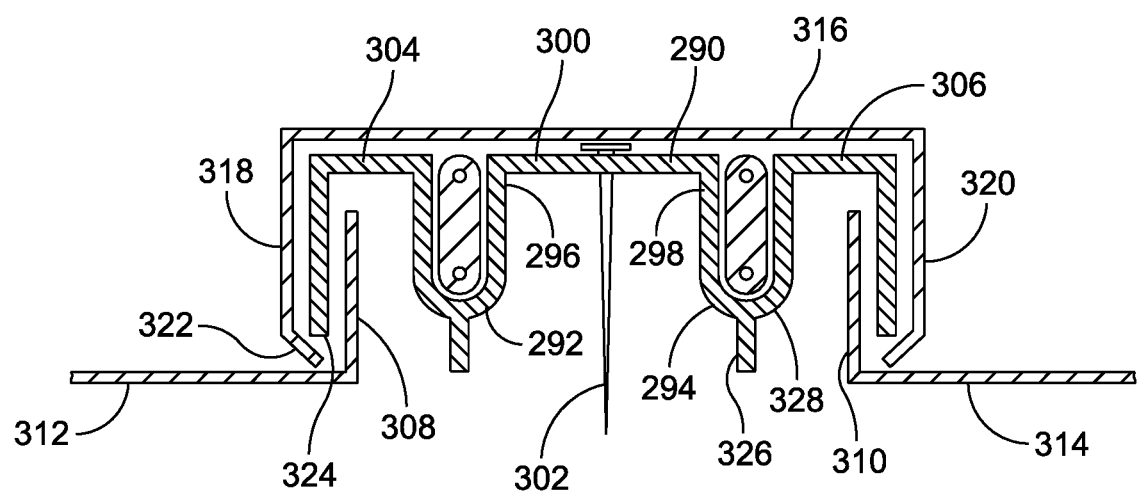
FIG. 18 is a partial cross-sectional view of a still further alternative embodiment of a heating system configuration, with a central fastened heating element supporting a heating cover cap interlocking two other heating panels abutting opposing sides of the heating element.

Turning now to FIG. 18, yet another alternative heating system has a heating element 290 with first 292 and second 294 u-shaped cable channels interconnected at their respective opposed upper interior ends 296, 298 by a central upper planar interconnecting section 300. A fastener 302 may penetrate a fastener passage (not shown) in the interconnecting section 300 to penetrate underlying support structure, such as a roof or roofing structure (not shown). Opposed, resilient, inverted-L-shaped arms 304, 306 respectively extend outwardly from the outer upper ends of the first and second u-shaped cable channels 292, 294. The opposed arms 304, 306 respectively abut upwardly extending planar arm ends 308, 310 from adjacent but spaced apart heating panels 312, 314 respectively. A central inverted-U-shaped, resilient heating cap section 316 securely covers and surrounds the heating element 290, which thereby retains the adjacent heating panels 312, 314 in place with respect to the heating element 290 and underlying support structure (not shown). The heating cap 316 includes opposed, resilient, planar downwardly extending locking arms 318, 320, each of which, e.g., 318, has an inwardly ramped lower lip end 322 that resiliently biases against and grips the mating lower arm end, e.g., 324, extending at the lowermost portion of the central heating cap 316.

Each of the cable channels, e.g., 294, have a support arm 326 extending transversely downwardly from the lowermost base section 328 of the cable channel 294 toward, and to abut, underlying support structure (not shown). This type of heating system panel, cover, and heating element structure can be very lightweight, relatively easy to manufacture (such as by extrusion for the heating element body), easy to assemble, and easy to maintain, expand, or revise, etc.

It should be understood that these various alternative structures and features may be mixed and matched as desired. Further, additional structures, such as additional heating elements and heating element covers, varying heating element structure, flashing, coping, or other interconnecting structure may be added as desired to achieve various ends, such as to further cover components from the elements and/or visibility, increase heat transfer among these or other components and surrounding elements, etc.

Further, it should be understood that various features disclosed herein can be added to pre-existing structures such as to pre-existing seam metal roofing panels. For example, a heating element, heating element cover, and heating cable can be added to pre-existing seam metal roofing panel to convert the seam metal roofing panel system to a heating system. Additional structure can be added to accomplish this end, such as by adding one or more upwardly extending interlocking ribs to a seam metal roofing panel, in order to secure the heating element cover in position on the seam metal roofing panel and to protect the heating element and heating cable from the elements and visibility. As noted above, further cap and flashing may be added to further cover, protect, and adapt the heating system components to surrounding structure and the environment of use.

The outer and other components may be painted as desired. For example, a wide variety of paints are available to paint aluminum for use in exterior applications. These paints can be used with relatively loss of heat transfer from the heating system to the surrounding environment, such as snow, rain, or sleet on or adjacent the outer surfaces of the heating system. An exemplary such paint is Kynar-500, PVF2 finish, which is preferably baked on each painted component in advance of installation of the painted component. Metallic paints may also be utilized to increase heat transfer capabilities of painted structure.

A wide variety of types of fasteners or fastener compositions may be utilized where shown or elsewhere in the heating system. Thus, although nail fasteners are shown in the accompanying drawings, screws, bolts, or adhesives may be used. Further, sealers or adhesive sealers may be utilized to further seal the heating system and prevent water or ice, for example, from penetrating the outer surfaces or edges of the heating system.

Additional sealing and supporting structure may be utilized with the heating systems disclosed herein. For example, a film, such as strippable polyvinyl film or other sealing film or sealant, may be added to the underside of the heating system (or a portion of it, such as the underside of a heating panel facing the heating element or extrusion and thus isolating the heating panel (which as noted above can be made of aluminum for example) from the heating element (which can be made from a differing material such as copper or other metals or alloys, such as a copper/aluminum mixture), providing a seal between that system (or the thus separated portions of it). As another example, such an isolator can be placed between the heating panel and/or heating element and the underlying structure, such as a metal roof for example. This can further seal the heating system from the elements, including by helping to isolate the dissimilar metals from each other, such as by isolating an aluminum heating element from a copper metal cover or panel. Alternatively, the sealing film may be added to the top of the underlying structure prior to mounting of the heating system over the film.

Yet other sealing films or materials may be utilized in the heating system. For example, if a heating panel is made of one type of metal composition and another component, such as a heating element, is made of differing type of metal composition, the sealing film or material may be included to reduce or eliminate contact between the differing metal compositions.

As noted above, the heating cable may be run in differing ways in addition to those shown herein. For example, exposed sections of the heating cable, or yet other heating cable, may be run (such as from the lower end of a heating panel) in adjacent gutters, along the drip/eave of a roof or panel, or on other structure, to reduce, and possibly eliminate, re-freezing of melted ice or snow running from the heating system through the gutter or other structure.

As also noted above, the shape of given heating panels may be adapted as desired. Thus, heating panels located at roof gables may be adapted to eliminate or add structure desired to conform to the roof gable, enhance aesthetics, etc.

Further, heating panels and other system structure may be secured to underlying or other structure, such as pre-existing roofing elements for example, in a variety of other ways. These other ways can include use of clips, adhesives, and exposed fasteners (that may be covered with paint and/or sealant as desired). Heating panel and other side laps or edges may be overlapped, interlocked, battened, or mechanically or electrically seamed and bound to each other or to other structure, such as to pre-existing metal roofing elements for example. Concealed clips or cleats may be used to secure heating panels and other heating system structure at, for example, roof eaves or valleys.

Insulation of various types may be disposed under the lower side of the heating element, and if desired under other heating or other panels, flashing, etc., to reduce or minimize heat loss downward to the roof deck surface as well as prevent heat loss up the roof plane via convection. Insulation may be installed in voids and slots on or adjacent the lower side of such structures as well, to the same ends.

What is claimed is:

1. A roof heating system comprising in combination:
  A. a first roof heating panel; and
  B. a second roof heating panel interlockingly mountable to the first roof heating panel, the first roof heating panel and second roof heating panel each having:
    (i) a top heating panel surface opposite a bottom heating panel surface,
    (ii) an upper end opposite a lower end, and
    (iii) a laterally extending section:
      (a) extending between the upper end and lower end of the associated heating panel; and
      (b) having a heating cap formed by a central heating cover section and a first heating cap side, opposite a second heating cap side, the first heating cap side and second heating cap side each extend from the central heating cover section laterally between the upper end and lower end of the associated heating panel; and
      (c) an interlockable protrusion extending upwardly from the top heating panel surface, the first roof heating panel's second heating cap side being interlockably mountable to abut the second roof heating panel's interlockable protrusion;

C. at least a first heating element mountable to abut either of: (i) the first roof heating panel's bottom heating panel surface in the first roof heating panel's heating cap; and (ii) the second roof heating panel's bottom heating panel surface in the second roof heating panel's heating cap.

2. The roof heating system of claim 1 wherein the first roof heating panel's second heating cap side is sealingly mountable to abut the second roof heating panel's interlockable protrusion.

3. The roof heating system of claim 2 wherein the first heating element has a plurality of heating material channels penetrating a top heating element surface on the first heating element.

4. The roof heating system of claim 3 wherein the plurality of heating material channels is a plurality of heater cable channels.

5. The roof heating system of claim 2 wherein the second roof heating panel's second heating cap side is mountable to interlockably abut another panel interlockable protrusion of another roof heating panel.

6. The roof heating system of claim 2 wherein each laterally extending section of the first roof heating panel and second roof heating panel includes at least one raised section intermediate the associated interlockable protrusion and the central heating cover section.

7. The roof heating system of claim 2 wherein the laterally extending section of the first roof heating panel is bounded by the upper end and lower end of the first roof heating panel and by the first heating cap side or the second heating cap side of the first roof heating panel.

8. The roof heating system of claim 7 wherein the laterally extending section of the second roof heating panel is bounded by the upper end and lower end of the second roof heating panel and by the first heating cap side or the second heating cap side of the second roof heating panel.

9. The roof heating system of claim 2 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

10. The roof heating system of claim 2 wherein the first heating element has a heating material channel penetrating a top heating element surface on the first heating element.

11. The roof heating system of claim 1 wherein the second roof heating panel's second heating cap side is mountable to interlockably abut another panel interlockable protrusion of another roof heating panel.

12. The roof heating system of claim 11 wherein each second heating cap side of the first roof heating panel and second roof heating panel extends at an angle from, and is biased by, the central heating cover section of the heating cap of the associated heating panel.

13. The roof heating system of claim 12 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

14. The roof heating system of claim 12 wherein the first heating element has a heating material channel penetrating a top heating element surface on the first heating element.

15. The roof heating system of claim 11 wherein each laterally extending section of the first roof heating panel and second roof heating panel includes at least one raised section intermediate the associated interlockable protrusion and the central heating cover section.

16. The roof heating system of claim 15 wherein the laterally extending section of the second roof heating panel is bounded by the upper end and lower end of the second roof heating panel and by the first heating cap side or the second heating cap side of the second roof heating panel.

17. The roof heating system of claim 15 wherein each second heating cap side of the first roof heating panel and second roof heating panel extends at an angle from, and is biased by, the central heating cover section of the heating cap of the associated heating panel.

18. The roof heating system of claim 11 wherein the laterally extending section of the first roof heating panel is bounded by the upper end and lower end of the first roof heating panel and by the first heating cap side or the second heating cap side of the first roof heating panel.

19. The roof heating system of claim 18 wherein the laterally extending section of the second roof heating panel is bounded by the upper end and lower end of the second roof heating panel and by the first heating cap side or the second heating cap side of the second roof heating panel.

20. The roof heating system of claim 19 wherein each second heating cap side of the first roof heating panel and second roof heating panel extends at an angle from, and is biased by, the central heating cover section of the heating cap of the associated heating panel.

21. The roof heating system of claim 18 wherein each second heating cap side of the first roof heating panel and second roof heating panel extends at an angle from, and is biased by, the central heating cover section of the heating cap of the associated heating panel.

22. The roof heating system of claim 11 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

23. The roof heating system of claim 1 wherein each laterally extending section of the first roof heating panel and second roof heating panel includes at least one raised section intermediate the associated interlockable protrusion and the central heating cover section.

24. The roof heating system of claim 23 wherein the first heating element has a plurality of heating material channels penetrating a top heating element surface on the first heating element.

25. The roof heating system of claim 24 wherein the plurality of heating material channels is a plurality of heater cable channels.

26. The roof heating system of claim 23 wherein the laterally extending section of the first roof heating panel is bounded by the upper end and lower end of the first roof heating panel and by the first heating cap side or the second heating cap side of the first roof heating panel.

27. The roof heating system of claim 26 wherein the laterally extending section of the second roof heating panel is bounded by the upper end and lower end of the second roof heating panel and by the first heating cap side or the second heating cap side of the second roof heating panel.

28. The roof heating system of claim 23 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

29. The roof heating system of claim 23 wherein the first heating element has a heating material channel penetrating a top heating element surface on the first heating element.

30. The roof heating system of claim 1 wherein the laterally extending section of the first roof heating panel is bounded by the upper end and lower end of the first roof heating panel and by the first heating cap side or the second heating cap side of the first roof heating panel.

31. The roof heating system of claim 30 wherein the laterally extending section of the second roof heating panel is bounded by the upper end and lower end of the second roof heating panel and by the first heating cap side or the second heating cap side of the second roof heating panel.

32. The roof heating system of claim 31 wherein the first heating element (i) extends laterally between the upper end and lower end of the first roof heating panel and (ii) has a plurality of laterally extending heating material channels penetrating a top heating element surface on the first heating element.

33. The roof heating system of claim 32 wherein the plurality of heating material channels is a plurality of heater cable channels.

34. The roof heating system of claim 31 wherein the laterally extending section of the first roof heating panel is also bounded by the interlockable protrusion of the first roof heating panel or of the second roof heating panel.

35. The roof heating system of claim 31 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

36. The roof heating system of claim 35 wherein the laterally extending section of the first roof heating panel is also bounded by the interlockable protrusion of the first roof heating panel or of the second heating panel.

37. The roof heating system of claim 31 wherein the laterally extending section of the first roof heating panel is also bounded by the interlockable protrusion of the first roof heating panel or of the second heating panel.

38. The roof heating system of claim 30 wherein the laterally extending section of the first roof heating panel is also bounded by the interlockable protrusion of the first roof heating panel or of the second heating panel.

39. The roof heating system of claim 38 wherein the first heating element (i) extends laterally between the upper end and lower end of the heating panel and (ii) has a plurality of laterally extending heating material channels penetrating a top heating element surface on the first heating element.

40. The roof heating system of claim 39 wherein the plurality of heating material channels is a plurality of heater cable channels.

41. The roof heating system of claim 38 wherein the first roof heating panel and second roof heating panel each consist essentially of a single formed panel.

42. The roof heating system of claim 38 wherein the first heating element has a heating material channel penetrating a top heating element surface on the first heating element.

43. The roof heating system of claim 30 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

44. The roof heating system of claim 43 wherein the laterally extending section of the first roof heating panel is also bounded by the interlockable protrusion of the first roof heating panel or of the second heating panel.

45. The roof heating system of claim 1 wherein each heating cap of the first roof heating panel and second roof heating panel is a U-shaped cap with the first heating cap side being one arm of the U-shaped cap, the second heating cap side being the opposed second arm of the U-shaped cap, and the central heating cover extending from and between the opposed first and second arms of the U-shaped cap.

46. The roof heating system of claim 45 wherein the first heating element (i) extends laterally between the upper end and lower end of the first heating panel and (ii) has a plurality of laterally extending heating material channels penetrating a top heating element surface on the first heating element.

47. The roof heating system of claim 46 wherein the plurality of heating material channels is a plurality of heater cable channels.

48. The roof heating system of claim 1 wherein the first heating element has a heating material channel penetrating a top heating element surface on the first heating element.

49. The roof heating system of claim 48 wherein the heating material channel is a heater cable channel.

50. The roof heating system of claim 1 further comprising:
D. a second heating element mountable to abut either of: (i) the first roof heating panel's bottom heating panel surface in the first-central heating cover section of the first roof heating panel; and (ii) the second roof heating panel's bottom heating panel surface in the central heating cover section of the first roof heating panel.

51. The roof heating system of claim 50 wherein the interlockable protrusion of the first roof heating panel or the second roof heating panel comprises a first bent panel section and the second sealing cap side of either the first or second roof heating panel comprises a second bent panel section.

52. The roof heating system of claim 51 wherein the first roof heating panel and second roof heating panel each consist essentially of a single formed panel.

53. The roof heating system of claim 51 wherein the first heating element has a heating material channel penetrating a top heating element surface on the first heating element.

54. The roof heating system of claim 50 wherein the first heating element has a heating material channel penetrating a top heating element surface on the first heating element.

55. The roof heating system of claim 1 wherein the interlockable protrusion comprises a bent panel section of either the first or second roof heating panel.

56. The roof heating system of claim 55 wherein the first heating element has a heating material channel penetrating a top heating element surface on the first heating element.

57. The roof heating system of claim 1 wherein the first roof heating panel and second roof heating panel each consist essentially of single formed panel.

* * * * *

UNITED STATES PATENT AND TRADEMARK OFFICE
CERTIFICATE OF CORRECTION

| | | |
|---|---|---|
| PATENT NO. | : 12,435,516 B2 | Page 1 of 1 |
| APPLICATION NO. | : 16/793956 | |
| DATED | : October 7, 2025 | |
| INVENTOR(S) | : Brian Casey | |

It is certified that error appears in the above-identified patent and that said Letters Patent is hereby corrected as shown below:

In the Claims

At Column 16, Line 37, delete "first-"

Signed and Sealed this
Twenty-seventh Day of January, 2026

John A. Squires
*Director of the United States Patent and Trademark Office*